3,157,654
AMINO, MERCAPTO QUINOXALINES
Klaus Sasse, Cologne-Stammheim, Richard Wegler, Leverkusen, and Günter Unterstenhöfer, Opladen, Germany, assignors to Farbenfabriken Bayer Aktiengesellschaft, Leverkusen, Germany, a corporation of Germany
No Drawing. Filed Jan. 23, 1961, Ser. No. 83,889
Claims priority, application Germany Jan. 22, 1960
10 Claims. (Cl. 260—250)

The present invention relates to and has as its objects new and useful insecticidal compounds and processes for the production thereof. The new inventive compounds may be represented by the following general formula

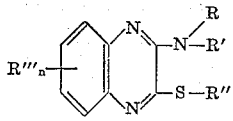

wherein R and R' denote hydrogen or an organic radical and may also be taken with one another and the nitrogen atom to form a heterocyclic ring such as morpholino and thiomorpholino, R'' stands for an organic radical linked to sulfur via an aliphatic carbon atom and hydrogen, R''' stands for a substituent which is inert towards amines and alkylating agents and $n$ stands for the number 1 to 4.

Quinoxalines substituted in the 2-position by an amino group and in the 3-position by an alkylmercapto group were hitherto not known. It has now been found that these compounds have useful biological properties which render them applicable chiefly as pest control agents but also as pharmaceuticals.

In accordance with this invention the new 2-amino-3-alkylmercapto-quinoxalines of the above general formula may be produced by the reaction steps shown in the following formula scheme:

captides, to form 2-halo-3-alkylmercapto-quinoxalines (III) and these are subsequently reacted with ammonia, a primary or secondary amine to give 2-amino-3-alkylmercapto-quinoxalines (VI).

According to the reaction steps I→IV→VI, or I→IV→V→VI, 2.3-dihaloquinoxalines are first reacted with ammonia, a primary or secondary amine to give 2-amino-3-haloquinoxalines (IV), these are reacted either directly with a mercaptan in the presence of an acid-binding agent to form (VI), or they are first reacted with alkali metal sulfides or alkali metal hydrogen sulfides to produce the 2-amino-3-mercapto-quinoxalines (V) which are subsequently subjected to alkylation.

Finally, the 2-amino-3-alkylmercapto-quinoxalines (VI) may also be obtained by the steps II→V→VI in that 2.3-dimercapto-quinoxalines (II) are heated with ammonia, primary or secondary amines, preferably in a solvent, whereby with the elimination of one mercapto group as hydrogen sulfide, the 2-amino-3-mercapto-quinoxalines (V) are formed which are then transformed into VI by alkylation.

The introduction of the alkyl radicals into the compounds V may be carried out by conventional alkylating agents such as alkyl halides, dialkyl sulfates or arylsulfonic acid alkyl esters, but also by the addition on compounds containing olefinic double bonds.

With the use of polyamines, polymercaptans or polyfunctional alkylating agents in one of the aforesaid reaction steps, it is also possible to prepare compounds in which several of the quinoxaline radicals illustrated by the formula scheme VI are combined with one another in one molecule via one or more of the groups R, R' or R''.

The biological properties of the 2-amino-2-mercapto-quinoxalines obtainable according to the invention may be characterized in greater detail by the following tests:

(1) Spider mites (*Tetranychus telarius*) were subjected

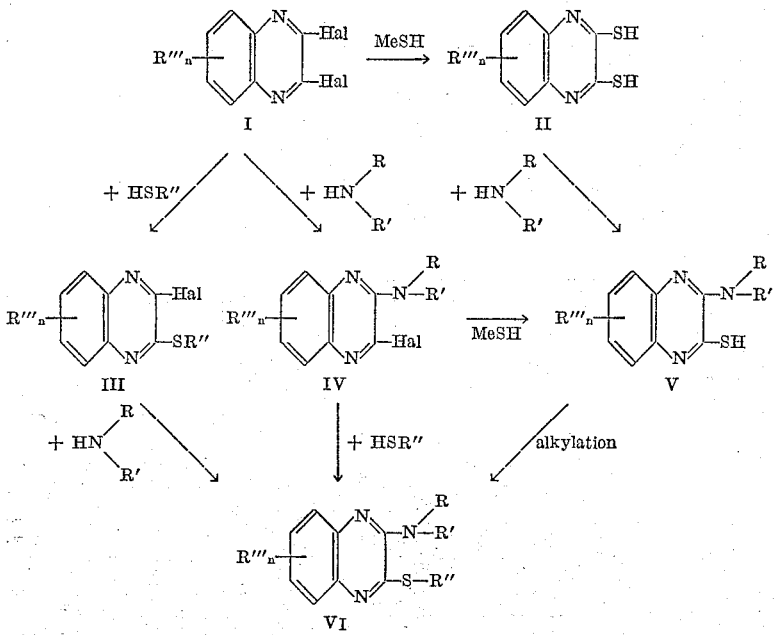

In the above formulae the symbols have the same significance as said above.

According to the reaction steps I→III→VI, 2.3-dihaloquinoxalines (I) are reacted with mercaptans in the presence of acid-binding agents, preferably alkali metal mercaptides, to form 2-halo-3-alkylmercapto-quinoxalines to the action of 2-amino-3-alkylmercapto-quinoxalines at a concentration of 0.2%. The active ingredients were emulsified in water by usual manners, i.e., by mixing them with about the same amounts of an auxiliary solvent such as aceton and with a commercial arylhydroxy polyglycol ether as emulsifier. The percentage of pests killed determined after 48 hours was as follows:

| Active substance | Percentage killed |
|---|---|
| 2-amino-3-methylthio-quinoxaline | 40 |
| 2-methylamino-3-methylthio-quinoxaline | 100 [1] |
| 2-methylamino-3-ethylthio-quinoxaline | 90 |
| 2-methylamino-3-isopropylthio-quinoxaline | 100 [1] |
| 2-methylamino-3-allylthio-quinoxaline | 90 |
| 2-methylamino-3-(2-methylpropylthio)-quinoxaline | 90 |
| 2-methylamino-3-benzylthio-quinoxaline | 100 |
| 2-methylamino-3-(p-chlorobenzylthio)-quinoxaline | 95 |
| 2-ethylamino-3-methylthio-quinoxaline | 100 |
| 2-ethylamino-3-(ethoxycarbonylmethylthio)-quinoxaline | 90 |
| 2-ethylamino-3-allylthio-quinoxaline | 100 |
| 2-allylamino-3-methylthio-quinoxaline | 40 [2] |
| 2-allylamino-3-allylthio-quinoxaline | 100 |

[1] Ovicidal effect.
[2] 100% ovicidal effect.

Ovicidal effect in the above table means that the respective compounds not only kill the pests but also their eggs.

(2) On caterpillars (*Plutella maculipennis*) the following values of mortality were established at concentrations of 0.2% (prepared as said under 1).

| Active substance | Percentage killed |
|---|---|
| 2-ethylamino-3-methylthio-quinoxaline | 60 |
| 2-ethylamino-3-allylthio-quinoxaline | 100 |
| 2-allylamino-3-methylthio-quinoxaline | 100 |

(3) Bean plants infested with aphids (*Doralis fabae*) were watered with 0.2% suspensions or emulsions (prepared as said before) of the active substance while protecting the green parts of the plants against contact-insecticidal action of the active ingredient. The systemic insecticidal action (developing through the roots) was determined by counting the insects killed after 6 days:

| Active substance | Percentage killed |
|---|---|
| 2-ethylamino-3-benzylthio-quinoxaline | 80 |
| 2-(1-propenylamino)-3-methylthio-quinoxaline | 100 |
| 2-benzylamino-3-isopropylthio-quinoxaline | 90 |
| 2-benzylamino-3-allylthio-quinoxaline | 100 |
| 2-benzylamino-3-benzylthio-quinoxaline | 100 |

The following examples are given for the purpose of illustrating the present invention:

*Example 1*

50 grams of 2.3-dimercapto-quinoxaline are finely powdered and suspended in 350 ml. of water. 53 grams of a 30% aqueous methylamine solution are added and the mixture slowly heated to the boil with stirring whereby the barely water-soluble methylamine salt of 2.3-dimercapto-quinoxaline is formed which is converted into the likewise barely water-soluble 2-methylamino-3-mercapto-quinoxaline with the evolution of hydrogen sulfide. After boiling for 3 hours the hydrogen sulfide evolution is completed. The reaction product is cooled, filtered off with suction and dried at about 100° C. Upon recrystallization there are obtained 27 grams of 2-methylamino-3-mercaptoquinoxaline, M.P. 221–223° C., of the formula

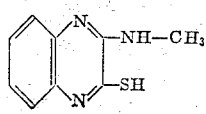

By using another corresponding amine there can be produced in analogous manner the following compounds:

With ammonia the 2 - amino - 3 - mercapto - quinoxaline (M.P. >300° C.)
With ethylamine the 2-ethylamino - 3 - mercapto - quinoxaline (M.P. 201–203° C.—alcohol)
With allylamine the 2-allylamino-3-mercapto-quinoxaline (M.P. 163° C.—CCl₄/ligroin)
With dodecylamine the 2-dodecylamino-3-mercapto-quinoxaline (M.P. 205–208° C.—alcohol)
With cyclohexylamine the 2-cyclohexylamino-3-mercapto-quinoxaline (M.P. 227° C.—benzene/ligroin)
With benzylamine the 2-benzylamino-3-mercapto-quinoxaline (M.P. 202° C.—alcohol)
With glycocoll the 2-carboxymethylamino-3-mercapto-quinoxaline (M.P. ≈200° C.—ethyl acetate/ligroin)
With ethanolamine the 2-hydroxyethylamino-3-mercapto-quinoxaline (M.P. 213° C.—alcohol)

*Example 2*

50 grams of finely powdered 2.3-dimercapto-quinoxaline are slowly heated to the boil while stirring in a mixture of 350 ml. of water and 44.5 grams of morpholine. No hydrogen sulfide is practically split off. The mixture is, therefore, cooled and the morpholine salt of 2.3-dimercapto-quinoxaline is filtered off with suction. The latter is heated to 140–150° C. after the addition of 11 grams of morpholine in 350 ml. of dimethyl formamide until no further hydrogen sulfide escapes. The dimethyl formamide is distilled off under reduced pressure. The residue is taken up in water and filtered off with suction. Yield: 35 grams of 2-morpholino-3-mercapto quinoxaline, M.P. 134° C. (alcohol), of the formula

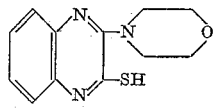

*Example 3*

To a suspension of 50 grams of finely powdered 2.3-dimercapto-quinoxaline in 350 ml. of water there are added 37 grams of 1-amino-3-diethylaminopropane and the mixture is boiled under reflux for 3 hours. After cooling, the supernatant aqueous layer is poured off from the separated oil. The crude 2-(3'-diethylamino-propyl-amino)-3-mercapto-quinoxaline (77 g.) is dissolved in dilute hydrochloric acid for further purification and the solution washed with benzene. The oil is reprecipitated by neutralization, taken up in benzene and dried over sodium sulfate. The solution is clarified with charcoal and distilled to remove the last traces of water. Excess dry hydrogen chloride is introduced into the benzene solution dried in the same way. The dihydrochloride thus obtained is very hygroscopic and is, therefore, advantageously transformed into the monohydrochloride by dissolving it in a little water and treating it with ammonia. Upon prolonged standing in ice the salt crystallizes out which is filtered off with suction and dried, yield: 18 grams of analytically pure product of the formula

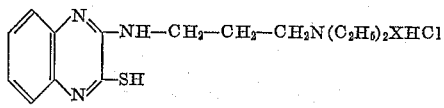

*Example 4*

19.1 grams of 2-methylamino-3-mercapto-quinoxaline are dissolved in a solution of 4 grams of sodium hydroxide in 30 ml. of water and, after dilution with 120 ml. of alcohol, treated dropwise at room temperature with 14.2 grams of methyl iodide. The mixture is stirred at room temperature for another ½ hour at 50° C., cooled and treated with water. The separated crystalline product is filtered off with suction, washed with water and dried.

Yield: 16 grams of 2-methylamino-3-methylmercapto-quinoxaline of the formula

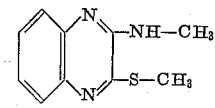

It melts at 87° C. upon recrystallization from ligroin.

If instead of methyl iodide there are used other alkyl halides the following compounds are obtained, for example:

With ethyl bromide the 2-methylamino-3-ethyl-mercapto-quinoxaline—yellow oil
With isopropyl bromide the 2-methylamino-3-isopropyl-mercaptoquinoxaline—M.P. 69° C. (ligroin)
With isobutyl chloride the 2-methylamino-3-isobutylmercaptoquinoxaline—yellow oil
With dodecyl chloride the 2-methylamino-3-dodecycl-mercaptoquinoxaline—M.P. 57° C. (ligroin)
With allyl bromide the 2-methylamino-3-allyl-mercapto-quinoxaline—M.P. 40° C. (petroleum ether)
With chloromethyl-allyl ether the 2-methylamino-3-allyloxymethylmercaptoquinoxaline—yellow oil
With bromoacetic acid ethyl ester the 2-methyl-amino-3-carbethoxy methylmercaptoquinoxaline—(alcohol)
With benzyl chloride the 2-methylamino-3-benzylmercaptoquinoxaline—M.P. 44° C.—(petroleum ether)
With p-chlorobenzyl chloride the 2-methylamino-3-p-chlorobenzylmercaptoquinoxaline—M.P. 92° C. (ligroin)
With ethylmercaptoethyl chloride the 2-methyl-amino-3-(ethylmercapto ethyl)mercaptoquinoxaline—M.P. 59–60° C.

and with the 1.4 dichlorobutane a compound of the formula

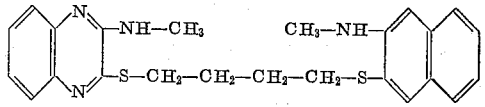

M.P. 155° C. (ligroin) .

If other 2-amino-3-mercapto-quinoxalines are reacted with methyl iodide according to the above indicated working instruction, the following compounds are obtained, for example:

2-amino-3 - methylmercaptoquinoxaline—M.P. 167–168° C. (buantol)
2-allylamino-3-methylmercapto-quinoxaline—yellow oil
2-β-hydroxyethylamino-3-methylmercapto - quinoxaline—M.P. 123° C. (alcohol)
2-carboxymethylamino-3-methylmercapto - quinoxaline—(M.P. 194° C.—dilute alcohol)
2-cyclohexylamino-3-methylmercapto-quinoxaline — M.P. 80° C. (alcohol)
2-benzylamino-3-methylmercapto-quinoxaline—M.P. 98° C. (alcohol)
2-morpholino-3-methylmercapto-quinoxaline—yellow oil By further variation of the reaction components there can be prepared in the same way the following compounds, for example:

2-ethylamino-3-benzylmercapto-quinoxaline—M.P. 77° C. (ligroin)
2-ethylamino-3-carbethoxymethylmercapto-quinoxaline — M.P. 66° C. (ligroin)
2-carboxymethylamino-3-benzylmercapto - quinoxaline — M.P. 146° C. (dilute alcohol)
2-β-hydroxyethylamino-3-benzylmercapto-quinoxaline — M.P. 102° C. (alcohol)
2-benzylamino-3-allylmercapto-quinoxaline—M.P. 61° C. (alcohol)
2-benzylamino - 3 - carbethoxymethylmercapto - quinoxaline—M.P. 78° C. (alcohol)
2-benzylamino-3-benzylmercapto-quinoxaline—M.P. 97° C. (alcohol)

2-benzylamino-3-isopropylmercapto - quinoxaline—M.P. 115° C. (alcohol)

If quinoxaline derivatives are used as starting materials in which the quinoxaline radical is substituted in the benzene nucleus the following compounds are obtained:

6-methyl-2-methylamino-3-methylmercapto-quinoxaline

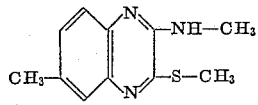

6-chloro-2-methylamino-3-benzylmercapto-quinoxaline

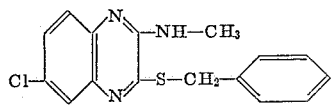

6-methoxy-2-methylamino-3-isopropylamino-quinoxaline

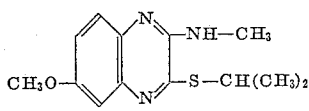

6-trifluoromethyl-2-dimethylamino - 3 - allylamino - quinoxaline

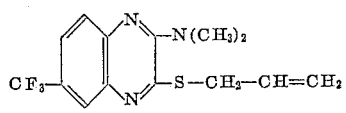

6-nitro-2-ethylamino - 3 - (p - chlorobenzylamino) - quinoxaline

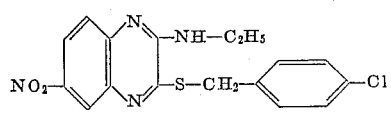

5.7-dichloro-2-methylamino-3-methylmercapto - quinoxaline

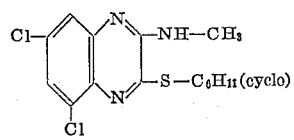

5-methyl-7-chloro-2-benzylamino-3 - isopropylmercapto-quinoxaline

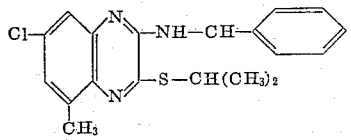

Example 5

30 grams of 2-amino-3-mercapto-quinoxaline are dissolved in a solution of 13.6 grams of sodium hydroxide in 130 ml. of water and treated dropwise at room temperature while stirring with a solution of 29.3 grams of diethylamino ethyl chloride hydrochloride in 50 ml. of water. The mixture is stirred at 40–50° C. for a further 1 hour, cooled, and the separated crystalline product is filtered off by suction.

Yield: 25 grams of 2-amino-3-(diethylaminoethyl)-mercapto-quinoxaline, M.P. 93–95° C. (ligroin), of the formula

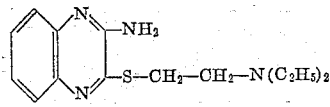

Example 6

If in Example 5 instead of 2-amino-3-mercapto-quinoxaline there are used 32.4 grams of 2-methylamino-3-mercapto-quinoxaline, there is initially obtained, after the conversion with the diethylaminoethyl-chloride hydrochloride, an oil which is taken up in benzene for further purification and which after drying (as in Example 3) with dry hydrogen chloride is obtained as the dihydrochloride. Yield: 59 g. of the compound

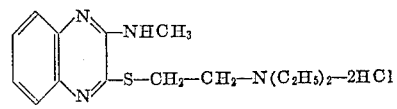

Example 7

The crude oily 2-(3'-diethylaminopropyl)-amino-3-mercapto-quinoxaline (77 grams) obtained in Example 3 is dissolved in 250 ml. of methanol and, after the addition of a solution of 10.5 grams of sodium hydroxide in 50 ml. of water, treated dropwise with cooling and stirring at a temperature below 15° C. with deficient methyl iodide (25 grams). The mixture is after-stirred at room temperature for a further ½ hour and then treated with water. The separated oil is taken up in benzene, dried and treated with gaseous hydrogen chloride. The product is rapidly filtered off with suction and dried in a vacuum desiccator. Yield: 18 grams of the compound

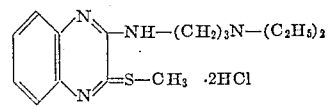

Example 8

A weak current of gaseous dimethylamine is introduced into a boiling solution of 30 grams of 2.3-dichloro-quinoxaline in 250 ml. of benzene for 3 hours. The cold mixture is thoroughly shaken twice with water, the benzene solution separated and dried. The benzene is distilled off, the residue taken up in carbon tetrachloride, boiled up with charcoal, filtered, slight quantities of crystals filtered off, the filtrate evaporated down to dryness, and after cooling treated with ligroin; 20 grams of 2-dimethylamino-3-chloroquinoxaline of the formula

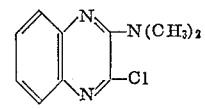

remain as residue; M.P. 62° C.

A sodium ethyl mercaptide solution is prepared by adding dropwise 6.2 g. ethyl mercaptan to a solution of 2.3 grams of sodium in 150 ml. of methanol, and into this solution the above obtained 2-dimethylamino-3-chloroquinoxaline is introduced at room temperature with stirring. The mixture is after-stirred for ½ hour, slowly heated to the boil and boiling continued under reflux for another 2 hours. The bulk of methanol is distilled off and the residue treated with water. An oil separates which is taken up in benzene. The benzene solution is washed with water and dried. After distilling off the benzene there remain 14 grams of 2-dimethylamino-3-ethylmercapto-quinoxaline of the formula

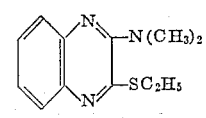

in the form of a yellow oil.

By the same way there may be obtained the following compound:

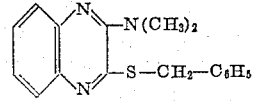

yellow oil.

We claim:
1. A quinoxaline compound of the formula in which R and R' taken individually stand for a member selected from the group consisting of hydrogen, alkyl having up to 12 carbon atoms, allyl, cyclohexyl, phenyl-lower alkyl, hydroxy-lower alkyl, lower alkoxy lower alkyl, amino-lower alkyl, lower alkyl amino lower alkyl, carboxy-lower alkyl and carbo-lower alkoxy-lower alkyl; and, when R and R' are taken with the nitrogen atom, morpholino and thiomorpholino in which R'' stands for a member selected from the group consisting of hydrogen, alkyl having up to 12 carbon atoms, allyl, cyclohexyl, phenyl-lower alkyl, hydroxy-lower alkyl, lower alkoxy-lower alkyl, amino-lower alkyl, lower alkyl amino lower alkyl, carboxy-lower alkyl, carbo-lower-alkoxy-lower alkyl, lower alkyl-mercapto-lower alkyl, and Alk being lower alkylene; in which R''' stands for a member selected from the group consisting of hydrogen, lower alkyl, halogeno, trifluoromethyl, nitro and lower alkoxy; and in which $n$ is a whole number up to 4.

2. The compound of the following formula

3. The compound of the following formula

4. The compound of the following formula

5. The compound of the following formula

6. The compound of the following formula

7. The compound of the following formula

8. The compound of the following formula

9. A compound of the formula wherein R and R'' are each alkyl having up to 12 carbon atoms.

10. A compound of the formula wherein R is alkyl having up to 12 carbon atoms and R'' is allyl.

References Cited in the file of this patent
FOREIGN PATENTS
476,899  Great Britain _____ Dec. 17, 1937

OTHER REFERENCES
Stevens et al.: J. Amer. Chem. Soc., vol. 68 (1946), pp. 1035–9; pp. 1037–8 are particularly relied on.
Crother et al.: J. Chem. Soc. (1949), pp. 1260–71; page 1262 particularly relied on.
Cheeseman: J. Chem. Soc. (1955), pp. 1804–9; page 1809 is particularly relied on.
Lowy: Organic Chemistry (Seventh Edition, 1951), page 215.